(12) United States Patent　(10) Patent No.: US 9,336,295 B2
Grokop et al.　(45) Date of Patent: May 10, 2016

(54) FUSING CONTEXTUAL INFERENCES SEMANTICALLY

(71) Applicant: QUALCOMM Incorporated, San Diego, CA (US)

(72) Inventors: Leonard Henry Grokop, San Diego, CA (US); Shankar Sadasivam, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/784,229

(22) Filed: Mar. 4, 2013

(65) Prior Publication Data

US 2014/0156659 A1　Jun. 5, 2014

Related U.S. Application Data

(60) Provisional application No. 61/732,778, filed on Dec. 3, 2012.

(51) Int. Cl.
*G06F 7/00* (2006.01)
*G06F 17/00* (2006.01)
*G06F 17/30* (2006.01)
*H04M 1/725* (2006.01)

(52) U.S. Cl.
CPC ..... *G06F 17/30598* (2013.01); *H04M 1/72563* (2013.01); *H04M 1/72569* (2013.01); *H04M 2250/12* (2013.01)

(58) Field of Classification Search
CPC ............... G06F 17/30893; G06F 17/30976; G06F 17/30592; G06F 17/30038; G06F 17/30598; G06F 17/30705; G06F 17/30811
See application file for complete search history.

(56) References Cited

U.S. PATENT DOCUMENTS

| | | | |
|---|---|---|---|
| 7,302,451 B2 | 11/2007 | Radhakrishnan et al. | |
| 7,865,505 B2 * | 1/2011 | Arasu et al. | 707/719 |
| 8,135,850 B2 | 3/2012 | Narayana et al. | |
| 8,266,082 B2 | 9/2012 | Lu et al. | |
| 8,429,103 B1 | 4/2013 | Aradhye et al. | |
| 8,924,345 B2 | 12/2014 | Bryan et al. | |

(Continued)

FOREIGN PATENT DOCUMENTS

| | | |
|---|---|---|
| EP | 1916828 A1 | 4/2008 |
| EP | 1939797 A1 | 7/2008 |

(Continued)

OTHER PUBLICATIONS

International Search Report and Written Opinion—PCT/US2013/071489—ISA/EPO—Mar. 17, 2014.

(Continued)

*Primary Examiner* — Susan Chen
(74) *Attorney, Agent, or Firm* — Hunter Clark PLLC (57) ABSTRACT

System and methods for performing context inference in a computing device are disclosed. In one embodiment, a method of performing context inference includes: determining, at a computing device, a first context class using context-related data from at least one data source associated with a mobile device; and determining, at the mobile device, a fusion class based on the first context class, the fusion class being associated with at least one characteristic that is common to the first context class and a second context class that is different from the first context class.

42 Claims, 6 Drawing Sheets

(56) References Cited

U.S. PATENT DOCUMENTS

| | | | |
|---|---|---|---|
| 2003/0009693 A1* | 1/2003 | Brock et al. | 713/201 |
| 2004/0259536 A1 | 12/2004 | Keskar et al. | |
| 2008/0249968 A1 | 10/2008 | Flinn et al. | |
| 2009/0119246 A1* | 5/2009 | Kansal | 707/2 |
| 2009/0190544 A1* | 7/2009 | Meylan et al. | 370/329 |
| 2009/0224867 A1 | 9/2009 | O'Shaughnessy et al. | |
| 2010/0114889 A1 | 5/2010 | Rabii et al. | |
| 2010/0138452 A1* | 6/2010 | Henkin et al. | 707/803 |
| 2010/0161541 A1 | 6/2010 | Covannon et al. | |
| 2010/0205061 A1* | 8/2010 | Karmarkar | 705/14.64 |
| 2010/0250196 A1* | 9/2010 | Lawler et al. | 702/184 |
| 2010/0299319 A1 | 11/2010 | Parson et al. | |
| 2010/0299615 A1 | 11/2010 | Miluzzo et al. | |
| 2010/0317371 A1 | 12/2010 | Westerinen et al. | |
| 2011/0125678 A1 | 5/2011 | Partridge | |
| 2012/0059780 A1 | 3/2012 | Koenoenen et al. | |
| 2012/0115453 A1 | 5/2012 | Zheng | |
| 2012/0290950 A1 | 11/2012 | Rapaport et al. | |
| 2012/0303271 A1 | 11/2012 | Chowdhary et al. | |
| 2013/0103212 A1* | 4/2013 | Andiappan | 700/286 |
| 2014/0129560 A1 | 5/2014 | Grokop et al. | |

FOREIGN PATENT DOCUMENTS

| | | |
|---|---|---|
| EP | 2447809 A2 | 5/2012 |
| EP | 2608503 A1 | 6/2013 |
| KR | 20120092459 A | 8/2012 |
| WO | 2011141761 A1 | 11/2011 |
| WO | 2012001215 A1 | 1/2012 |

OTHER PUBLICATIONS

International Preliminary Report on Patentability—PCT/US20131071489 The International Bureau of WIPO—Geneva, Switzerland, Feb. 20, 2015, 8 pgs.

International Preliminary Report on Patentability—PCT/US2013/058669, The International Bureau of WIPO—Geneva, Switzerland, Feb. 17, 2015, 8 pgs.

International Search Report and Written Opinion—PCT/US2013/058669—ISA/EPO—Jan. 31, 2014, 12 pgs.

* cited by examiner

FUSING CONTEXTUAL INFERENCES SEMANTICALLY

CLAIM OF PRIORITY UNDER 35 U.S.C. §119

This application claims the benefit of U.S. Provisional Application No. 61/732,778 entitled "FUSING CONTEXTUAL INFERENCES SEMANTICALLY" filed Dec. 3, 2012, assigned to the assignee hereof and hereby expressly incorporated by reference herein in its entirety.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

SUMMARY

An example method for performing context inference in a computing device includes: determining, at a computing device, a first context class using context-related data from at least one data source associated with a mobile device; and determining, at the mobile device, a fusion class based on the first context class, the fusion class being associated with at least one characteristic that is common to the first context class and a second context class that is different from the first context class.

Implementations of such a method may include one or more of the following features. The fusion class has an associated label that semantically encapsulates a label of the first context class and a label of the second context class. The method further includes obtaining information associated with an initial classification used to determine the first context class. Obtaining the information associated with the initial classification comprises obtaining a confidence value associated with the initial classification. Determining the fusion class is performed in response to the confidence value having an undesirable value. Obtaining the information associated with the initial classification comprises identifying an operational property of the initial classification. Determining the fusion class is based on the operational property of the initial classification. The context-related data are first context-related data associated with a first time, the method further including determining the second context class using second context-related data associated with a second time that is after the first time, where determining the fusion class is based on the first context class and the second context class. Determining the first context class comprises selecting the first context class from a plurality of predetermined available context classes. Determining the fusion class comprises selecting the fusion class from a plurality of predetermined available fusion classes.

An example apparatus includes: first determining means for determining a first context class using context-related data from at least one data source associated with a mobile device; and second determining means, communicatively coupled to the first determining means, for determining a fusion class based on the first context class, the fusion class being associated with at least one characteristic that is common to the first context class and a second context class that is different from the first context class.

Implementations of such an apparatus may include one or more of the following features. The fusion class has an associated label that semantically encapsulates a label of the first context class and a label of the second context class. The first determining means comprise obtaining means for obtaining information associated with an initial classification used to determine the first context class. The obtaining means are configured to obtain a confidence value associated with the initial classification. The second determining means are configured to determine the fusion class in response to the confidence value having an undesirable value. The obtaining means are configured to identify an operational property of the initial classification. The second determining means are configured to determine the fusion class based on the operational property of the initial classification. The context-related data are first context-related data associated with a first time, the second determining means being further for determining the second context class using second context-related data associated with a second time that is after the first time, where the second determining means are configured to determine the fusion class based on the first context class and the second context class. The first determining means are configured to determine the first context class by selecting the first context class from predetermined available context classes. The second determining means are configured to determine the fusion class by selecting the fusion class from predetermined available fusion classes.

An example mobile device includes: at least one data source; a target state classifier communicatively coupled to the at least one data source and configured to determine a first context class using context-related data from the at least one data source; and a fusion classifier, communicatively coupled to the target state classifier, configured to determine a fusion class based on the first context class, the fusion class being associated with at least one characteristic that is common to the first context class and a second context class that is different from the first context class.

Implementations of such a mobile device may include one or more of the following features. The fusion class has an associated label that semantically encapsulates a label of the first context class and a label of the second context class. The target state classifier is configured to obtain information associated with an initial classification used to determine the first context class. The target state classifier is configured to obtain a confidence value associated with the initial classification. The fusion classifier is configured to determine the fusion class in response to the confidence value having an undesirable value. The target state classifier is configured to identify an operational property of the initial classification. The fusion classifier is configured to determine the fusion class based on the operational property of the initial classification. The context-related data are first context-related data associated with a first time, the fusion classifier is configured to determine the second context class using second context-related data associated with a second time that is after the first time, and the fusion classifier is configured to determine the fusion class based on the first context class and the second context class. The target state classifier is configured to determine the first context class by selecting the first context class from predetermined available context classes. The fusion classifier is configured to determine the fusion class by selecting the fusion class from predetermined available fusion classes.

An example processor-readable storage medium includes processor-readable instructions configured to cause a processor to: determine a first context class using context-related data from at least one data source associated with a mobile device; and determine a fusion class based on the first context class, the fusion class being associated with at least one characteristic that is common to the first context class and a second context class that is different from the first context class.

Implementations of such a storage medium may include one or more of the following features. The fusion class has an associated label that semantically encapsulates a label of the first context class and a label of the second context class. The storage medium further includes instructions configured to cause the processor to obtain information associated with an initial classification used to determine the first context class. The instructions configured to cause the processor to obtain the information associated with the initial classification comprise instructions configured to cause the processor to obtain a confidence value associated with the initial classification. The instructions configured to cause the processor to determine the fusion class are configured to cause the processor to determine the fusion class in response to the confidence value having an undesirable value. The instructions configured to cause the processor to obtain the information associated with the initial classification comprise instructions configured to cause the processor to identify an operational property of the initial classification. The instructions configured to cause the processor to determine the fusion class are configured to cause the processor to determine the fusion class based on the operational property of the initial classification. The context-related data are first context-related data associated with a first time, the storage medium further including instructions configured to cause the processor to determine the second context class using second context-related data associated with a second time that is after the first time, where the instructions configured to cause the processor to determine the fusion class are configured to cause the processor to determine the fusion class based on the first context class and the second context class. The instructions configured to cause the processor to determine the first context class are configured to cause the processor to select the first context class from predetermined available context classes. The instructions configured to cause the processor to determine the fusion class are configured to cause the processor to select the fusion class from predetermined available fusion classes.

Items and/or techniques described herein may provide one or more of the following capabilities, and/or possibly one or more other capabilities not mentioned. Data collected from mobile device data sensors can indicate a target context state. A target state classifier can be trained to detect a target context state. Target context states can be associated with a low confidence value due to ambiguities between particular target context states. A fusion classifier can semantically fuse a set of target classifiers. As a result, context inference with fusion classification can be more accurate than context inference from the detected target context states. Other capabilities may be provided and not every implementation according to the disclosure must provide any, let alone all, of the capabilities discussed. Further it may be possible for an effect noted above to be achieved by means other than that noted and a noted item/technique may not necessarily yield the noted effect.

DETAILED DESCRIPTION

Described herein are techniques for fusing contextual inferences associated with a computing device. The techniques described herein can be used to aid in context determination for devices such as smartphones, laptop or tablet computers, personal digital assistants (PDAs), etc., as well as any other computing device presently existing or existing in the future. Other uses may also be possible. While various examples given in the description below relate to mobile computing devices, the techniques described herein can be applied to any device for which context inference is desirable.

Advancements in mobile device technology have given mobile devices the ability to detect and use device and user context information, such as the location of a device, events occurring in the area of the device, etc., in performing and customizing functions of the device. One way in which a mobile device can be made aware of its user's context is the identification of dialogue in the ambient audio stream. For instance, a device can monitor the ambient audio environment in the vicinity of the device and its user and determine when conversation is taking place. This information can then be used to trigger more detailed inferences such as speaker and/or user recognition, age and/or gender estimation, estimation of the number of conversation participants, etc. Alternatively, the act of identifying conversation can itself be utilized as an aid in context determination. For instance, detected conversation can be utilized to determine whether a user located in his office is working alone or meeting with others, which may affect the interruptibility of the user.

Further, an objective of mobile context awareness is to have a device infer what its user is doing. This can be evaluated along multiple dimensions, such as by the type of place the user is located (e.g., office, conference room, lecture hall, home, gym, restaurant, coffee shop, bar, etc.) or the type of situation the user is in (e.g., meeting, working alone, driving, having lunch, working out, sleeping, etc.). Each such dimension is referred to herein as a context. By inferring user contexts, a range of applications are facilitated, such as, but not limited to, the following:

1) Automating device functionality such as diverting calls to voicemail or responding to text messages when the user is uninterruptible, adjusting the ringer volume based on the environment, notifying meeting participants when the user is running late, etc.

2) Automating social networking interaction such as check-ins, notifying friends when the user is nearby, etc.

3) Providing health care information such as calories burned, miles walked, hours spent at work vs. play, etc.

4) Facilitating accurate and timely recommendations such as for restaurants, shops, consumer products, gasoline, etc.

Applications utilizing context awareness services fall into two categories: those that utilize deterministic inference, and those that utilize only statistical inference. An example of an application that uses deterministic inference is a detector that brings up a driving-based user interface (UI), e.g., having large buttons, speedometer alerts, etc., when a context awareness service detects the user is driving. An example of an application using only statistical inference is a user profiler that attempts to estimate the average number of hours the user spends driving by utilizing a similar (or same) context awareness service that detects when the user is driving. Applications using deterministic inference may not be able to tolerate false alarms or missed detections (i.e., classifier errors). For example, an incorrect classification could result in a user's mobile device instantiating a driving UI while the user is on a bus, or vice versa.

To reduce classifier errors that would result in incorrect operation such as that exampled above, context inferences are semantically fused as described below. In general, given a set of independent supervised classifiers that have each been trained to detect a target class, a new classifier is created and used to output one class from a new set of classes when the original classifiers detect multiple target classes. To each new class, an associated label is attached that semantically encapsulates labels of classes in the set of detected target classes that triggers its output.

Figure 1:
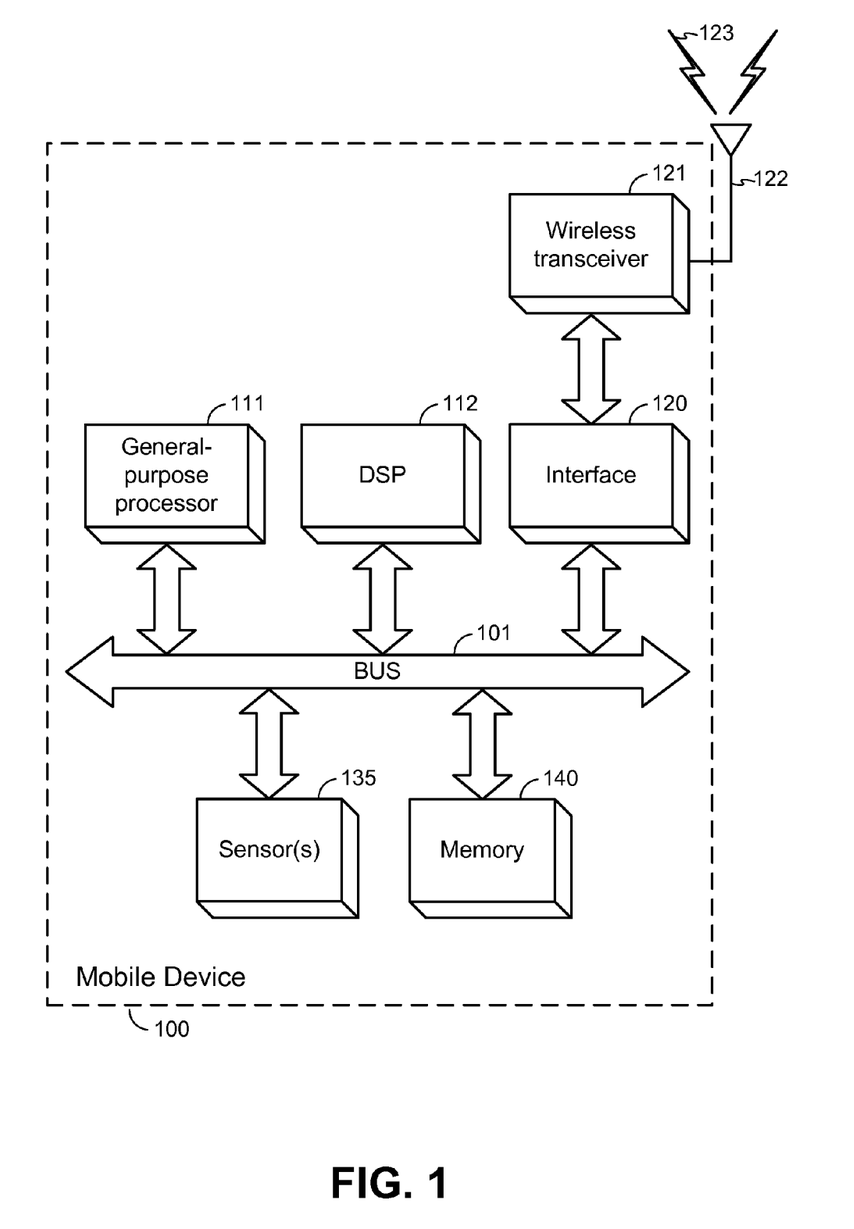
FIG. 1 is a block diagram of components of a mobile computing device.

The techniques described herein can be utilized for a mobile device, such as the example mobile device 100 illustrated in FIG. 1. The mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as Wi-Fi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111 and DSP 112 are connected to the bus 101, either directly or by a bus interface 110. Additionally, the memory 140 is connected to the bus 101 either directly or by a bus interface (not shown). The bus interfaces 110, when implemented, can be integrated with or independent of the general-purpose processor 111, DSP 112 and/or memory 140 with which they are associated.

The memory 140 includes a non-transitory processor-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory that stores software code (processor-readable programming code, processor-readable instructions, etc.) configured to cause the processor 111 and/or DSP 112 to perform the functions described. Alternatively, one or more functions of the mobile device 100 may be performed in whole or in part in hardware.

The mobile device 100 further includes one or more sensors 135 that capture data associated with the mobile device 100 and/or its surroundings. The sensors 135 may include, but are not limited to, microphones or audio sensors, cameras, light sensors, pressure sensors, inertial sensors (e.g., accelerometers and/or gyroscopes), magnetometers, etc. The sensors 135 may be used individually or in combinations, such as sensor arrays or any other combinations. Multiple sensors 135, if implemented by the mobile device 100, can operate interdependently or independently of one another. The sensors 135 are connected to the bus 101, either independently or through a bus interface (not shown). For instance, the sensors 135 can communicate with the DSP 112 through the bus 101 in order to process data captured by the sensors 135. The sensors 135 can additionally communicate with the general-purpose processor 111 and/or memory 140 to generate or otherwise obtain metadata associated with captured data. In some embodiments, the antenna 122 and/or transceiver 121 may also be utilized as sensors, for example to sense or detect wireless signals such as Wi-Fi signals.

Figure 2:
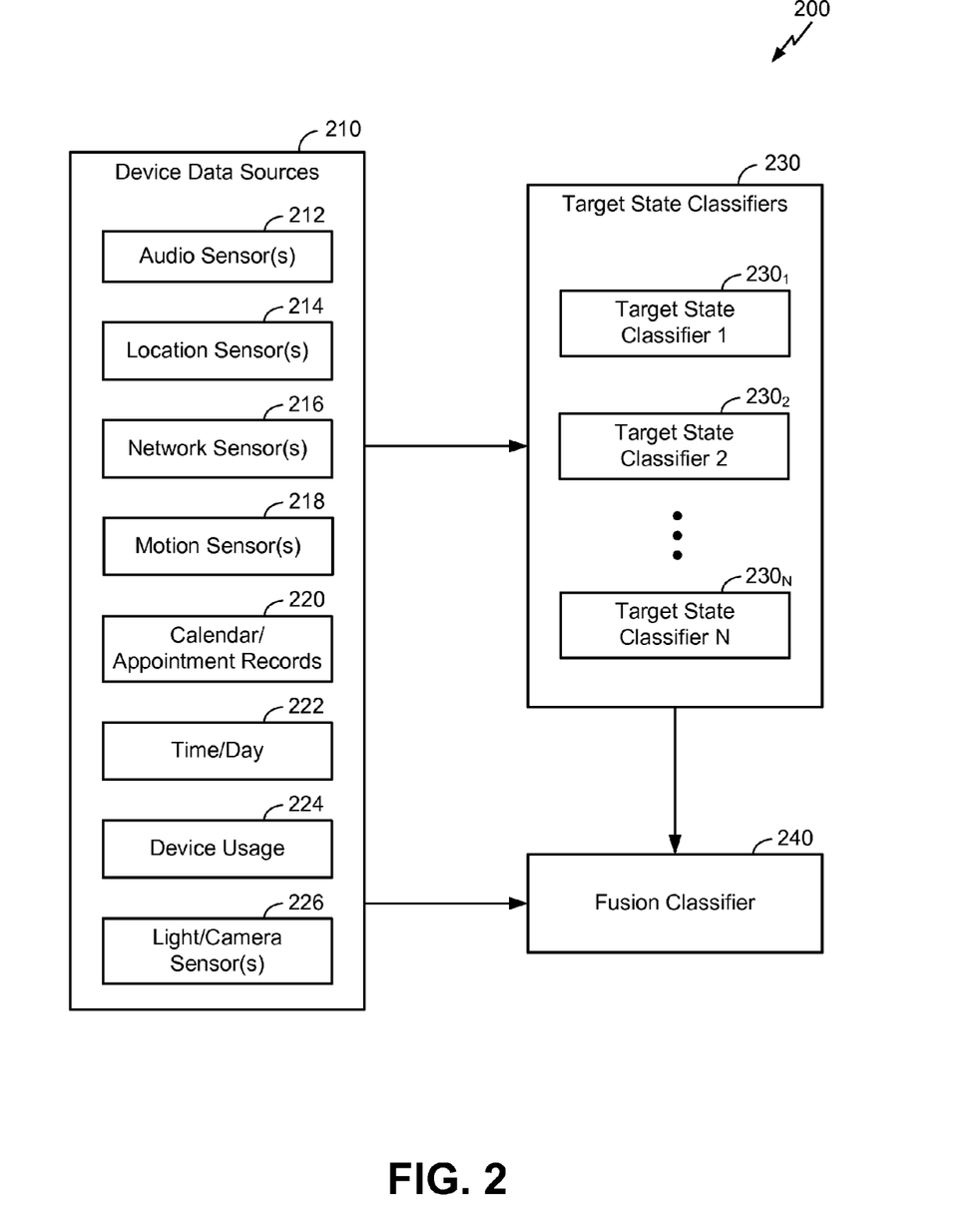
FIG. 2 is a block diagram of a context inference and classification system.

FIG. 2 illustrates an embodiment of a context inference and classification system 200 that can be utilized by the mobile device 100 shown in FIG. 1. The system 200 includes one or more device data sources 210, target state classifiers 230, and a fusion classifier 240. The target state classifiers 230 and the fusion classifier 240 are communicatively coupled to the device data sources 210 and the fusion classifier 240 is communicatively coupled to the target state classifiers 230. The device data sources 210 may include, but are not limited to, audio sensors 212 such as microphones, location sensors 214 such as GPS transceivers, network sensors 216 such as Wi-Fi and/or other radio transceivers, motion sensors 218 such as accelerometers or gyroscopes, calendar/appointment records 220, sources of time/day information 222 such as a system clock or other mechanisms, device usage monitors 224, light and/or camera sensors 226, etc. The device data sources 210 provide data that are utilized by a set of state classifiers, including a set of target state classifiers 230 and a fusion classifier 240, to infer contextual properties associated with the mobile device 100. Operation of the target state classifiers 230 and the fusion classifier 240 are described in further detail below.

Data collected from the device data sources 210 can take any form usable by the target state classifiers 230 and/or the fusion classifier 240. For instance, such data can include audio samples from the audio sensors 212; GPS readings from the location sensors 214; network strength and/or other network-related readings from the network sensors 216; motion, acceleration or orientation data from the motion sensors 218, entries associated with a calendar 220, etc. In addition to the data, labels applied to the data can also be collected and/or utilized. For instance, calendar entries may be labeled with a location or title, e.g., "user's office" or "doctor appointment." Any other data types, data labels, or other aspects of information usable by the target state classifiers 230 and/or the fusion classifier 240 could also be used.

The target state classifiers 230, as described above, are independently supervised classifiers that are each trained to detect a target context state. Given the target state classifiers 230, the fusion classifier 240 is used as a new classifier to output one of a new set of fusion classes under various conditions, e.g., the target state classifiers 230 detect multiple classes, no target state is detected with an adequate level of confidence, etc. Each fusion class is assigned a label that semantically encompasses and encapsulates a set of detected target states; the fusion class is a joint state for a set of merged target states detected by respective target classifiers. The fusion classes each share, and the fusion class labels are indicative of, a characteristic common to multiple classes (e.g., multiple target context states). The fusion classifier 240 outputs the particular fusion class triggered by an encompassed target state. In this way, the fusion classifier 240 represents a merged set of target state classifiers 230.

For example, for three supervised motion classifiers trained to detect states walk, sit and stand, respectively, the fusion classifier 240 can output a state labeled stationary when both sit and stand are detected. As another example, for supervised motion classifiers trained to detect states walk, run, drive, bus, and subway, the fusion classifier 240 can output pedestrian_motion when walk or run is detected and vehicular_motion when drive, bus, or subway is detected. An illustrative view of these groupings is given by system 300 in FIG. 3. However, the concepts described herein are not limited to motion classification; any suitable classification types could be utilized, such as location classification (e.g., indoor vs. outdoor, work vs. home, etc.), event classification (e.g., meeting detection, etc.), environment classification (e.g., based on network availability or signal strength, etc.), etc.

If the target state classifiers 230 output probabilities or confidence values associated with their detection decision, then the fusion classifier 240 can utilize these in determining its output. For example, for two supervised classifiers trained to detect in_office and in_meeting and each outputting confidence values for their decisions, the fusion classifier 240 can be configured to output at_work when either in_office or in_meeting is detected with low confidence (or in_office and in_meeting are detected, both with low confidence). In either of these cases, the confidence in either or both of the particular context states (here in_office and in_meeting) is low, but the confidence of the fusion class (here, at_work) is high. The fusion classifier 240 may output the original classification output, e.g., in_office or in_meeting, when one is detected with high confidence, or to output the classification with the higher confidence value if both are detected with high confidence. The level of confidence indicates the degree of ambiguity associated with the target state classification decision based on the input data.

The fusion classifier 240 may output a fused class based on one or more classes output by a multi-class supervised classifier that outputs one or more classes from a set of trained classes. The fusion classifier 240 is configured to output one class, from a set of classes, with a label that semantically encapsulates all classes outputted by the original classifier. For example, given a supervised audio classifier trained to detect the number of speakers present, i.e., trained with classes "0 speakers," "1 speaker," "2 speakers," "3 speakers," etc., the fusion classifier 240 may output either "no speakers," "1 speaker" or "many speakers." Alternatively, the classifier 240 may be configured to output "no speakers," "few speakers," or "many speakers." As another example, for a classifier trained for classes 1) not in meeting, 2) in meeting with person A, and 3) in meeting with person B, the fusion classifier 240 is configured to output either 1) not in meeting or 2) in meeting. Still other configurations may be used.

If a target state classifier 230 assigns a probability distribution (or a similar set of weightings) to the set of classes it has been trained to classify based on received input data, the fusion classifier 240 can select its output based on this information. For example, if a three-state classifier trained to discriminate between walk, sit and stand provides an output (walk, sit, stand) with respective probabilities (0.0, 0.4, 0.6), the fusion classifier 240 can output stationary (e.g., as the original classifier is ambivalent between sit and stand).

If a target state classifier 230 assigns a confidence value to its output decision based on the input data, the fusion classifier 240 can select its output based on one or more of the following: 1) the original classifier's output; 2) the confidence value associated with the output; and/or 3) known behavior of the original classifier. This may be used, e.g., if the original classifier is known to commonly confuse a subset of states and the confidence value is known to indicate a possible confusion or ambiguity. In some implementations, the fusion classifier 240 may be more robust due to less associated ambiguity than the original target state classifier 230. For the previous example, if the original classifier performs and initial classification based on the input data and outputs sit with a low confidence value and this classifier is known to commonly confuse sit and stand, the fusion classifier 240 outputs stationary. In some cases, the fusion classifier 240 may disregard the confidence value. For example, multiple applications may wish to utilize the same trained classifier outputs, but some may have lower accuracy tolerance than others. The applications with lower tolerance may decide to output a broader semantic class in some or all cases in which the original classifier outputs any class known to be commonly confused with others.

The fusion classifier 240 may operate by semantically merging contextual inferences over a temporal dimension. For example, if the original classifier outputs a sequence of 7 decisions (sit, stand, sit, sit, sit, stand, stand) over consecutive periods of 3 seconds each, the fusion classifier 240 outputs a single decision stationary, which encapsulates and merges the previous 21 seconds of decisions. Alternatively, the fusion classifier 240 may operate on the same time scale as the original classifier, semantically filtering context inferences. Continuing the previous example, the fusion classifier 240 may output filtered decisions at the same rate of the original classifier (i.e., once every 3 seconds), e.g., (sit, stand, stationary, stationary, stationary, stationary, stationary).

Further examples of operations that may be performed by the fusion classifier 240 are as follows.

1) For a classifier trained to discriminate between driving and on_bus states, the fusion classifier 240 outputs in_transit when either of the original classes is outputted with low confidence.

2) For a classifier that detects in_office, the fusion classifier 240 outputs at_work when the confidence of the detection is low.

3) For a situation classifier that selects from two classes named hanging_out_with_friends and having_lunch, the fusion classifier 240 outputs having_lunch_with_friends when the outputted probabilities for the two original classes are within 0.2 of each other (e.g., 0.6 and 0.4).

The above examples are not an exhaustive list of implementations of the fusion classifier 240, and other use cases are possible.

To restate the above, the target state classifiers 230 receive data from the device data sources 210 and classify the data into respective states. The fusion classifier 240 is communicatively coupled to the target state classifiers 230 and configured to receive classifier decisions from the target state classifiers 230 and, optionally, other information (e.g., confidence values, etc.). Based on information received from the target state classifiers 230, the fusion classifier 240 determines whether to output the original state provided by the target state classifiers 230 or a new, merged state that semantically encompasses the state that was provided by the target state classifiers 230 as well as one or more similar states, e.g., states for which the output state may have been provided as erroneous output. Additionally, the fusion classifier 240 may receive data directly from the device data sources 210. This data may include duplicate data to those data provided to the target state classifiers 230 and/or other data.

As an example, the target state classifiers 230 may be built into one or more integrated circuits (ICs), chipsets, or other hardware modules and accessed via an application programming interface (API). The API is configured to provide outputs of the target state classifiers 230 and their associated confidence values or probabilities. The fusion classifier 240 is built by a device manufacturer, operating system developer or application developer and implements semantic fusing for the target state classifiers 230 with respect to one or more particular applications. While FIG. 2 illustrates a system 200 with a single fusion classifier 240, multiple fusion classifiers 240 could be used. For instance, multiple fusion classifiers 240 may be associated with respective applications or sets of applications such that a given application utilizes the target state classifiers 230 in combination with the fusion classifier 240 that corresponds to the application. A fusion classifier 240, or respective ones of a set of fusion classifiers 240, may also be adjusted or customized based on user preferences, application properties, or any other criteria that could potentially have an effect on the classification of data from the device data sources 210 into respective context states. Other implementations are also possible.

Figure 3:
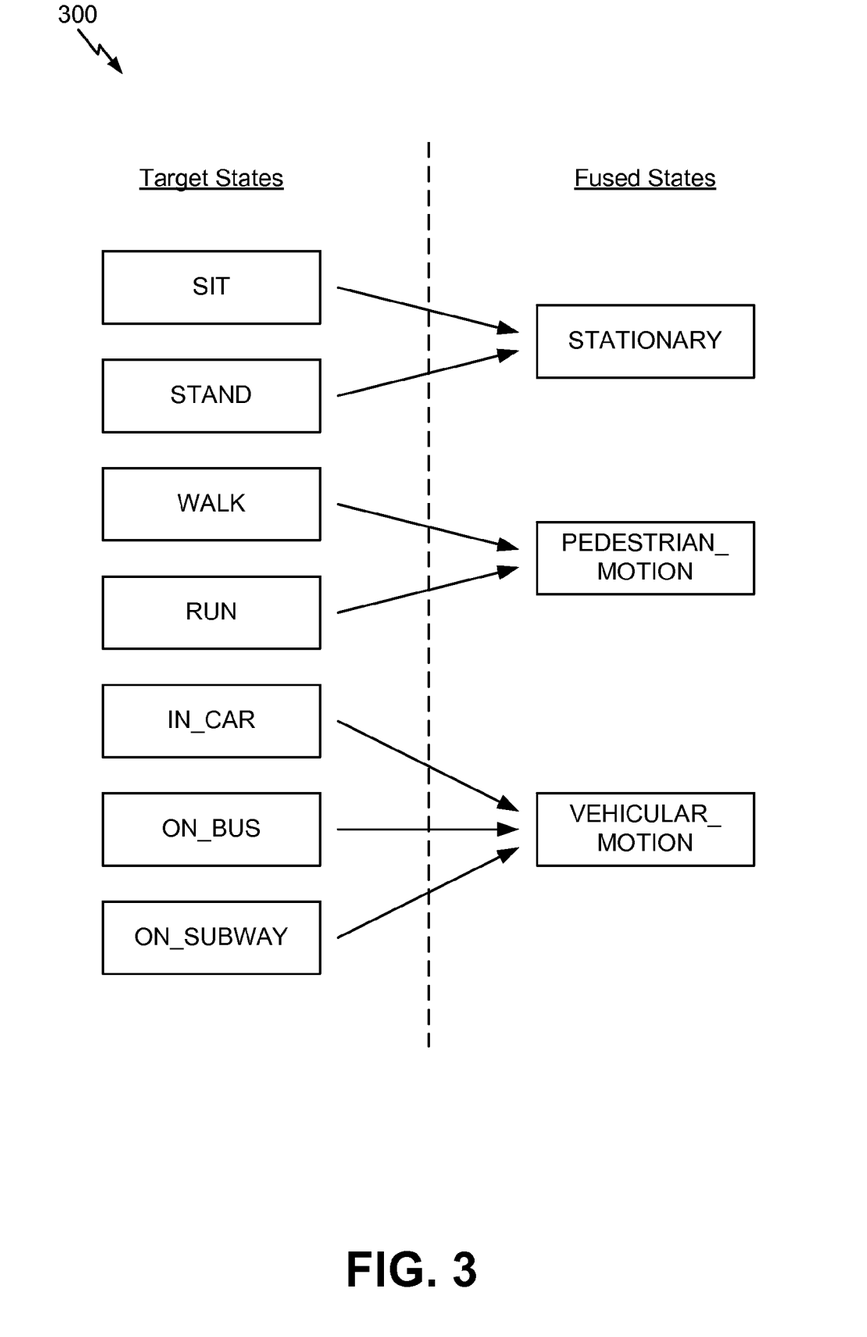
FIG. 3 is an illustrative view of state classifications usable by the system shown in FIG. 2.

As an alternative to system 300 in which the target state classifiers 230 and fusion classifier 240 are shown as separate entities, the target state classifiers 230 and fusion classifier 240 could be implemented as a single, multi-stage classifier. For instance, first states could be identified at a first classifier stage as described above with respect to the target state classifiers 230, and subsequently second states could be identified at a second classifier stage in a similar manner to that described with respect to the fusion classifier 240.

Additionally or alternatively, the fusion classifier 240 as shown in FIG. 3 can perform temporal analysis of outputs from the target state classifiers 230 to enhance the stability of the target state classifiers 230 and/or obtain implied confidence values, probability distributions or other soft decision metrics when no explicit confidence outputs are available from the target state classifiers 230. Here, the fusion classifier 240 identifies outputs from a particular target state classifier 230 over time, e.g., by buffering or otherwise storing classifier outputs over a period of time. Based on the history of initial classifier decisions and any changes to those decisions, the fusion classifier 240 can elect to either output the initial state decision or a new state decision. As an example, if a target state classifier 230 alternates (perhaps quickly) between two related states (e.g., in adjacent or near-adjacent decisions), the fusion classifier 240 can output a fusion class to avoid ping-pong effects between indicating the individual, different states. To illustrate, if an initial classifier alternates rapidly between sit and stand, the fusion classifier 240 may infer a low confidence level, substitute a new decision (e.g., stationary) for the initial decisions, or take other suitable actions.

As another example, if an initial classifier outputs the same state for a predetermined number of decisions and subsequently switches to a new state, the fusion classifier 240 can detect the change and output a broader or intermediate state for one or more state decisions following the change. To illustrate, if a target state classifier 230 outputs walk for several decisions and then switches to run, the fusion classifier 240 may output pedestrian_motion for one or more decisions when the switch to run is identified.

As a further example, the fusion classifier 240 can leverage one or more operational properties of the target state classifiers 230 in combination with historical data from the target state classifiers 230 to increase classification accuracy. For instance, in an example where an initial classification is known to have difficulty distinguishing between in_car and on_train states in some cases, the fusion classifier 240 can substitute an initial context inference with a broader inference, such as vehicular_motion, if the initial classifier output is found to alternate between in_car and on_train.

As noted above, the target state classifiers 230 and fusion classifier 240 infer a user and/or device context based at least in part on information received from device data sources 210. While some examples given above relate to motion classification, any suitable low-level features may be utilized, and any suitable low-level inferences (e.g., context inferences or other inferences) can be performed. By way of example, and not limitation, a list of possible low-level features that can be computed from data obtained from device data sources 210 include the following:

GPS velocity, accuracy, altitude
\# GPS satellites visible
Time of day, day of week, weekday/weekend, public holiday
Weather, temperature
Ambient light sensor readings
Proximity sensor readings
Camera data, intensity, R/G/B (red/green/blue) intensity, features such as DCT (discrete cosine transform) coefficients, object(s) detected in camera field of view
Closest geographic points of interest (POIs)
Bluetooth devices visible and corresponding RSSIs (received signal strength indications), new/old Bluetooth devices within range
Wi-Fi APs (access points) visible and corresponding RSSIs, new/old Wi-Fi APs visible
Ambient audio energy level
Movement detection (any device movement vs. no device movement)

Similarly, a list of possible low-level inferences that can be computed by the target state classifiers 230 and/or fusion classifier 240 includes, but is not limited to, the following:

Motion state (walking, running, driving, etc.)
Device position (pocket, hand, desk, bag, etc.)
Speech detection (speech/no speech)
Speaker recognition (device owner speaking/someone else speaking)
Number of speakers present
Target sound detection (baby crying/not crying, etc.)
Zone (Home/Work/Other/In transit or Residential/Commercial, etc.)
Device usage (number of screen touches per minute, number of characters typed per minute, etc.)
Display ON vs. OFF
Application usage (type of application running (e.g. game, email, etc.), number of applications simultaneously running, etc.)

Figure 4:
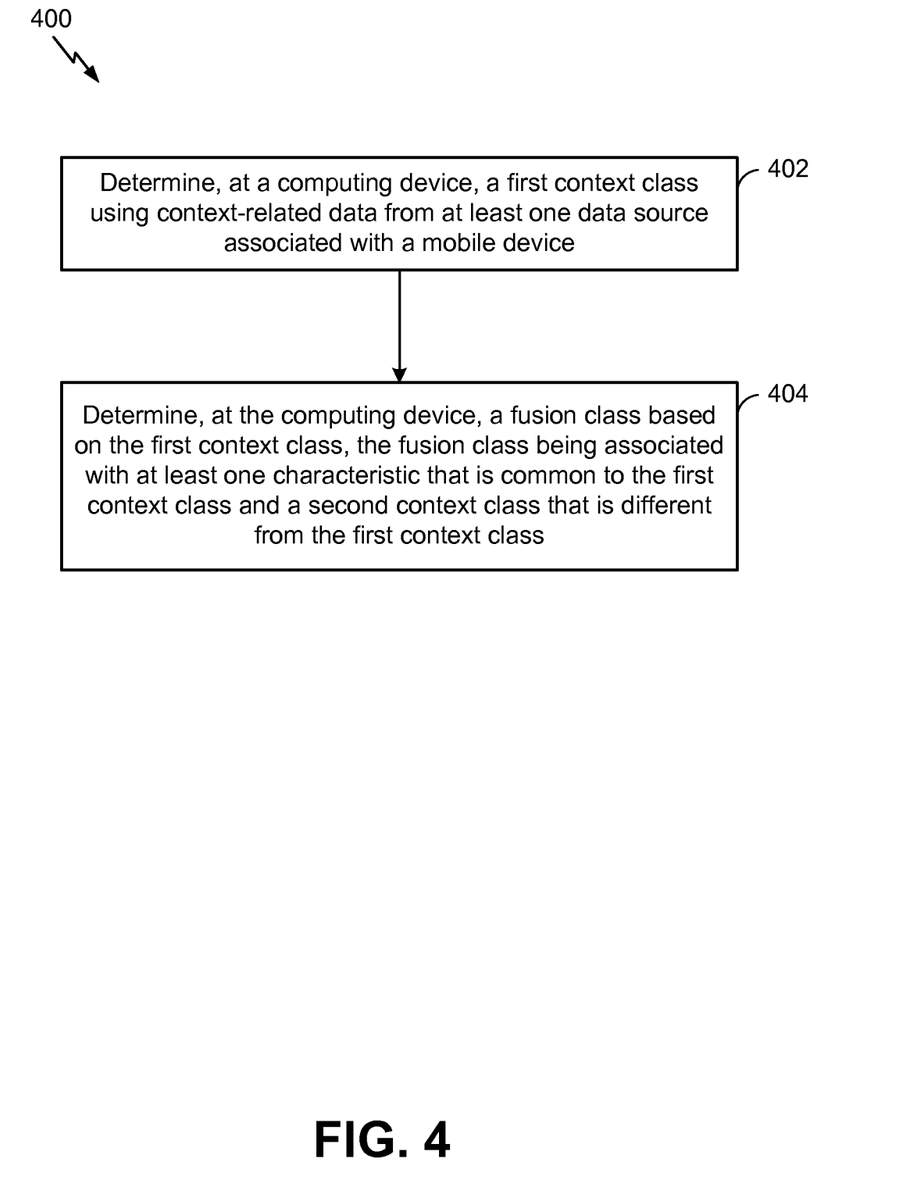
FIGS. 4-5 are block flow diagrams of respective processes of performing contextual inference with respect to a computing device.

Referring to FIG. 4, with further reference to FIGS. 1-3, a first process 400 of performing contextual inference with respect to a computing device includes the stages shown. The process 400 is, however, an example only and not limiting. The process 400 can be altered, e.g., by having stages added, removed, rearranged, combined, and/or performed concurrently. Still other alterations to the process 400 as shown and described are possible.

At stage 402, the process 400 includes determining, at a computing device, a first context class using context-related data from at least one data source (e.g., at least one of the data sources 210) associated with the mobile device 100. The first context class may be, e.g., a context class from a set of context classes assigned to the context-related data by the set of target state classifiers 230 and/or other mechanisms. In general, however, the first context class may be determined at stage 402 in any suitable manner. Classifiers, classification algorithms, or other means for determining the first context class may be a part of and/or otherwise controlled by a device performing the process 400 and/or by other devices. The first context class may be determined synchronously (e.g., according to a period, schedule or other timeframe) or asynchronously (e.g., in response to triggering events for measurement, classification or reporting). The first context class may be determined by selecting the first context class from multiple, predetermined, available context classes. The first context class may represent hard decisions (e.g., discrete state values or other indicators), which may or may not include supplemental information such as probability and/or confidence information. Alternatively, the first context class may result in soft decisions, e.g., as a vector of probabilities for each of a set of context classes, or other forms. Other formats and/or techniques for the first context class at stage 402 are possible.

At stage 404, the process 400 includes determining, at the computing device, a fusion class based on the first context class, the fusion class being associated with at least one characteristic that is common to the first context class and a second context class that is different from the first context class. The fusion class may be determined, e.g., in response to the first context class having an associated confidence that is low, and/or in response to the first class and the second class both being determined, and/or the first class being amenable to grouping without loss of relevant information (e.g., "few speakers" vs. "2 speakers"), etc. The fusion classifier 240 determines the fusion class, e.g., by analysis of relationships between context classes and fusion classes. The fusion class may be determined by selecting the first context class from multiple, predetermined, available fusion classes. The fusion classifier 240 may determine more than one fusion class associated with the first context class (e.g., "at work" and "in meeting"). Each of the fusion classes (i.e., the fusion class labels) semantically encapsulates a given set of context classes, as described above (e.g., stationary to encapsulate sit and stand, many_speakers to encapsulate all context classes associated with more than a given number of speakers, etc.). Fusion classification can merge or combine multiple context classes into a fusion class. As generally described above with respect to the fusion classifier 240 shown in system 200, selection of the fusion class is performed by one or more techniques including, but not limited to, 1) identifying multiple context classes (e.g., both with low confidence) and selecting a fusion class that encapsulates the context classes; 2) identifying a context class having a low confidence (e.g., a confidence value that is an undesirable value, e.g., below a threshold value, or at or below the threshold value) or low probability and selecting a fusion class that represents a broader case or context encompassing the context class; 3) identifying trends or changes in context classes over time and selecting a fusion class that represents a broader case or context encompassing corresponding context classes in response to qualifying changes in the context class; 4) identifying an operational property (or operational properties) of an initial classification that resulted in the context class(es), such as a context class that is commonly confused in connection with the first classification, and substituting a context class with a fusion class when deemed appropriate based on these properties; etc.

More than one fusion class may be determined. For example, the mobile device 100 may be determined to have a context class of sit with an undesirable confidence value, and may also be determined to be alternating between context classes of in_office and in_meeting. The fusion classifier 240 may determine fusion classes of both stationary and at_work for the mobile device 100 in this example.

Figure 5:
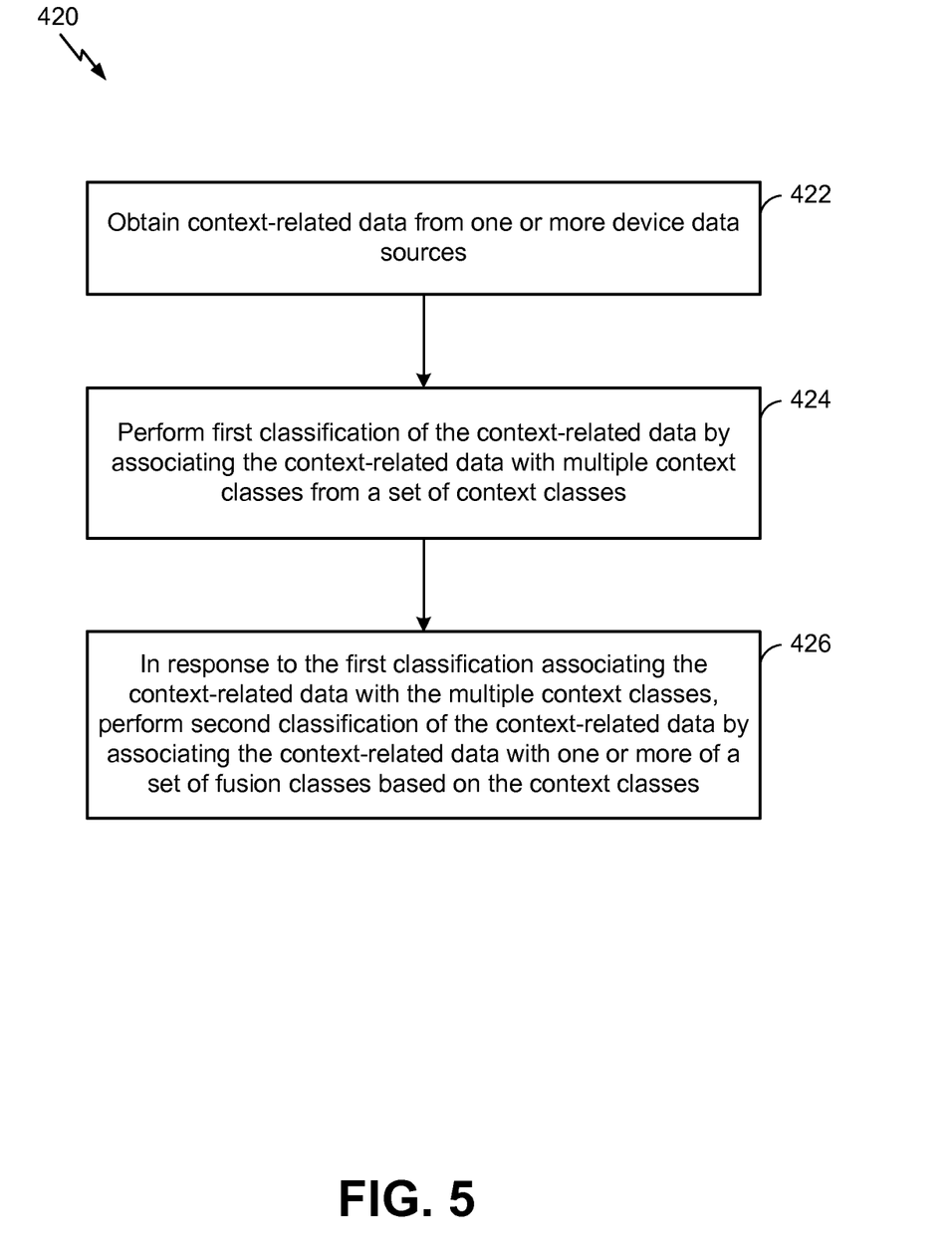

Referring to FIG. 5, with further reference to FIGS. 1-3, a second process 420 of performing contextual inference with respect to a computing device includes the stages shown. The process 420 is, however, an example only and not limiting. The process 420 can be altered, e.g., by having stages added, removed, rearranged, combined, and/or performed concurrently. Still other alterations to the process 420 as shown and described are possible.

At stage 422, context-related data is obtained from one or more device data sources, e.g., the device data sources 210 shown in system 200. The data may be obtained synchronously (e.g., according to a period, schedule or other timeframe) or asynchronously (e.g., in response to triggering events for measurement or reporting at the device data sources 210).

At stage 424, first classification of the context-related data is performed (e.g., by target state classifiers 230 as shown in system 200) by associating the data with multiple context classes from a set of context classes. The first classification may result in hard decisions or soft decisions, as described above with respect to process 400 in FIG. 4. In either case, classification is performed for multiple context classes, either through a multi-state classifier or a set of classifiers configured to each detect corresponding state(s).

At stage 426, in response to the first classification performed at stage 424 associating the context-related data with the multiple context classes, a second classification of the context-related data is performed (e.g., by a fusion classifier 240 as shown in system 200) by associating the data with one (or more) of a set of fusion classes based on the context classes. Here, the second classification performed at stage 426 is similar to the fusion classification performed at stage 404 of process 400, although different classification techniques are possible.

Figure 6:
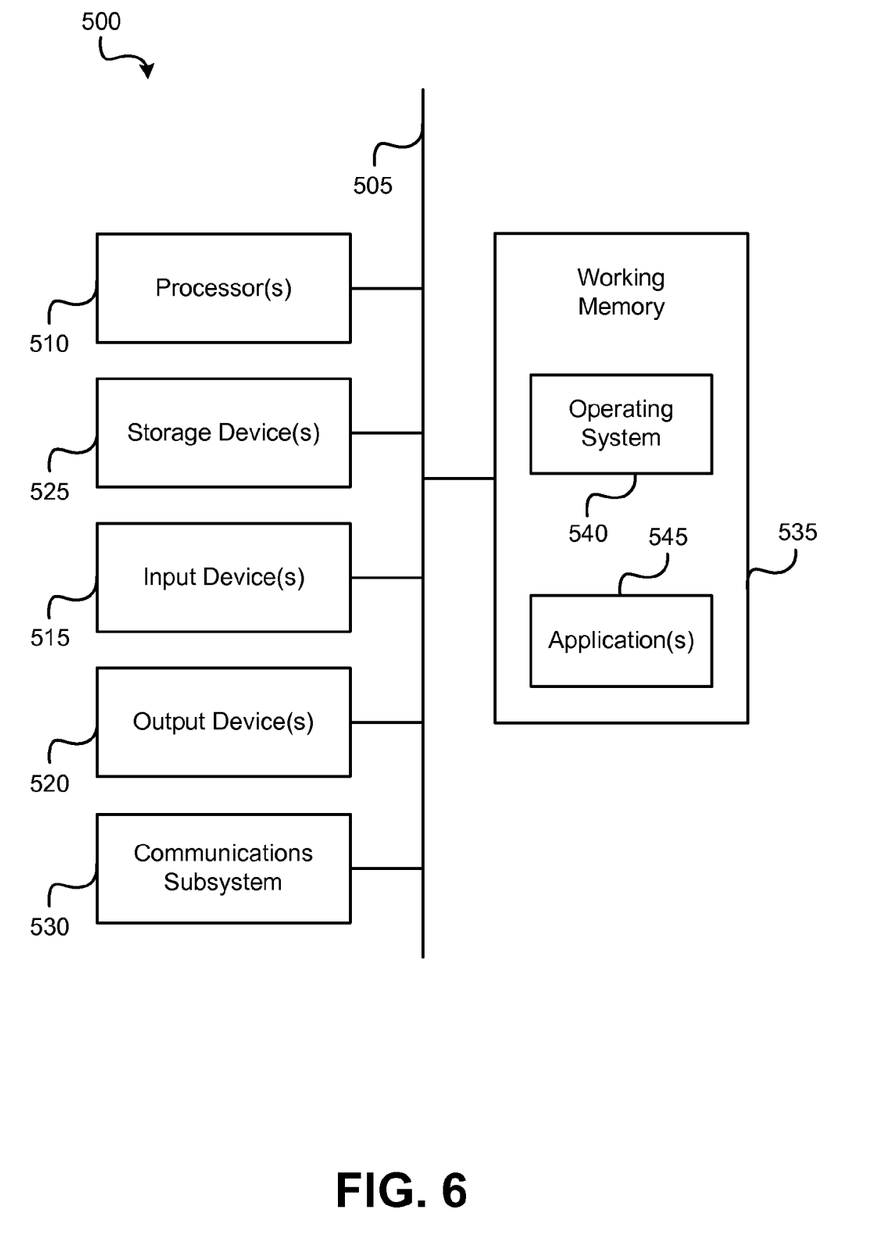
FIG. 6 illustrates a block diagram of an embodiment of a computer system.

A computer system 500 as illustrated in FIG. 6 may be utilized to at least partially implement the functionality of the previously described computerized devices. For example, the computer system 500 can be utilized to at least partially implement the processes 400, 420 shown in FIGS. 4-5 in software. The computer system 500 may also be implemented via one or more of the components of the mobile device 100 shown in FIG. 1, such as the general-purpose processor 111 and/or memory 140. The computer system 500 may additionally or alternatively be used to provide at least a partial software implementation the system 200 shown in FIG. 2 and/or one or more of its components, such as modules 230, 240. Other implementations of the computer system 500 are possible. For example, the input devices 515 may comprise and/or be used to implement any of the device data sources 210 as shown in FIG. 2. Further, the processor 510 and/or portions of the working memory 535, such as either the operating system 540 or the application 545 in combination with the processor 510 or operating independently, may comprise and/or be used to implement any of the modules 230, 240 shown in FIG. 2. In some embodiments, the processor 510 may comprise and/or be used to implement the processor 111 and/or the DSP 112, as shown in FIG. 1, and one or both of the working memory 535 and the storage device 525 may comprise and/or be used to implement the memory 140, also shown in FIG. 1.

FIG. 6 provides a schematic illustration of one embodiment of a computer system 500 that can perform the methods provided by various other embodiments, as described herein, and/or can function as a mobile device or other computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like. The processor(s) 510 can include, for example, intelligent hardware devices, e.g., a central processing unit (CPU) such as those made by Intel® Corporation or AMD®, a microcontroller, an ASIC, etc. Other processor types could also be utilized.

The computer system 500 may further include (and/or be in communication with) one or more non-transitory storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer), and such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 500) may be used to perform methods in accordance with the disclosure. Some or all of the procedures of such methods may be performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refers to any non-transitory computer program product, apparatus and/or device (e.g. magnetic discs, optical disks, memory, Programmable Logic Devices (PLDs)) that participates in providing machine instructions and/or data that causes a machine to operate in a specific fashion. In an embodiment implemented using the computer system 500, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for performing context inference in a mobile device, the method comprising:
   receiving, at a classifier implemented in one or more integrated circuits of the mobile device, sensor data from at least one data source associated with the mobile device, wherein the at least one data source comprises one or more sensors of the mobile device;
   determining, by the classifier implemented in the one or more integrated circuits, a first context class for the received sensor data, the first context class corresponding to a context state indicated by the received sensor data;
   determining, by the classifier implemented in the one or more integrated circuits, that a confidence value associated with the determination of the first context class is below a threshold value;
   creating, by the classifier implemented in the one or more integrated circuits, a fusion class for the received sensor data at least in part by fusing the first context class for the received sensor data and at least a second context class for the received sensor data, the at least the second context class being different from the first context class, wherein the fusion class semantically encompasses the first context class and the at least the second context class and further wherein the fusion class is broader than each of the first context class and the at least the second context class;
   substituting, by the classifier implemented in the one or more integrated circuits, the fusion class for the first context class; and
   outputting, by the classifier implemented in the one or more integrated circuits, the fusion class as the inferred context of the mobile device.

2. The method of claim 1 wherein the at least one data source comprises one or more of an audio sensor, a transceiver, a motion sensor, a clock, a device usage sensor, a light sensor, a camera, or a calendar.

3. The method of claim 1 wherein determining the first context class further comprises determining the confidence value associated with the determination of the first context class.

4. The method of claim 1 wherein the determining the first context class is an initial classification of the received sensor data.

5. The method of claim 1 wherein the substituting the fusion class is performed in response to the confidence value associated with the determination of the first context class being below the threshold value.

6. The method of claim 4 further comprising identifying an operational property of the initial classification, the operational property including at least one of a motion, a location, an event, or an environment associated with the initial classification.

7. The method of claim 6 wherein the creating the fusion class is based on the operational property of the initial classification.

8. The method of claim 1 comprising:
receiving the sensor data over consecutive time periods;
determining the first context class for the received sensor data associated with a first time period; and
determining the at least the second context class for the received sensor data associated with at least a second time period that is after the first time period.

9. The method of claim 1 wherein determining the first context class comprises selecting the first context class from a plurality of predetermined available context classes.

10. The method of claim 1 wherein the creating the fusion class comprises selecting the fusion class from a plurality of predetermined available fusion classes.

11. A mobile device comprising:
means for receiving sensor data from at least one data source associated with the mobile device, wherein the at least one data source comprises one or more sensors of the mobile device;
means for determining a first context class for the received sensor data, the first context class corresponding to a context state indicated by the received sensor data;
means for determining that a confidence value associated with the determination of the first context class is below a threshold value;
means for creating a fusion class for the received sensor data at least in part by fusing the first context class for the received sensor data and at least a second context class for the received sensor data, the at least the second context class being different from the first context class, wherein the fusion class semantically encompasses the first context class and the at least the second context class and further wherein the fusion class is broader than each of the first context class and the at least the second context class;
means for substituting the fusion class for the first context class; and
means for outputting the fusion class as an inferred context for the mobile device.

12. The mobile device of claim 11 wherein the at least one data source comprises one or more of an audio sensor, a transceiver, a motion sensor, a clock, a device usage sensor, a light sensor, a camera, or a calendar.

13. The mobile device of claim 11 comprising means for determining the confidence value associated with the determination of the first context class.

14. The mobile device of claim 11 wherein the determination of the first context class is an initial classification of the received sensor data.

15. The mobile device of claim 11 wherein the means for substituting the fusion class is configured to substitute the fusion class in response to the confidence value associated with the determination of the first context class being below the threshold value.

16. The mobile device of claim 14 comprising means for identifying an operational property of the initial classification, the operational property including at least one of a motion, a location, an event, or an environment associated with the initial classification.

17. The mobile device of claim 16 comprising means for creating the fusion class based on the operational property of the initial classification.

18. The mobile device of claim 11 comprising:
means for receiving the sensor data over consecutive time periods;
means for determining the first context class for the received sensor data associated with a first time period; and
means for determining the at least the second context class for the received sensor data associated with at least a second time period that is after the first time period.

19. The mobile device of claim 11 wherein the means for determining the first context class is configured to determine the first context class by selecting the first context class from a plurality of predetermined available context classes.

20. The mobile device of claim 11 wherein the means for creating the fusion class is configured to create the fusion class by selecting the fusion class from a plurality of predetermined available fusion classes.

21. A mobile device comprising:
at least one data source comprising one or more sensors of the mobile device;
a classifier built into one or more hardware modules of the mobile device, the one or more hardware modules comprising one or more integrated circuits, and communicatively coupled to the at least one data source, wherein the classifier is configured to:
receive sensor data from the at least one data source; determine a first context class for the received sensor data, the first context class corresponding to a context state indicated by the received sensor data;
determine that a confidence value associated with the determination of the first context class is below a threshold value;
create a fusion class for the received sensor data at least in part by fusing the first context class for the received sensor data and at least a second context class for the received sensor data, the at least the second context class being different from the first context class, wherein the fusion class semantically encompasses the first context class and the at least the second context class and further wherein the fusion class is broader than each of the first context class and the at least the second context class;
substitute the fusion class for the first context class; and
output the fusion class as an inferred context for the mobile device.

22. The mobile device of claim 21 wherein the at least one data source comprises one or more of an audio sensor, a transceiver, a motion sensor, a clock, a device usage sensor, a light sensor, a camera, or a calendar.

23. The mobile device of claim 21 wherein the classifier is configured to determine the confidence value associated with the determination of the first context class.

24. The mobile device of claim 21 wherein the determination of the first context class is an initial classification of the received sensor data.

25. The mobile device of claim 21 wherein the classifier is configured to substitute the fusion class in response to the confidence value associated with the determination of the first context class being below the threshold value.

26. The mobile device of claim 24 wherein the classifier is configured to identify an operational property of the initial classification, the operational property including at least one of a motion, a location, an event, or an environment associated with the initial classification.

27. The mobile device of claim 26 wherein the classifier is configured to create the fusion class based on the operational property of the initial classification.

28. The mobile device of claim 21 wherein the classifier is further configured to:
  receive the sensor data over consecutive time periods;
  determine the first context class for the received sensor data associated with a first time period; and
  determine the at least the second context class for the received sensor data associated with at least a second time period that is after the first time period.

29. The mobile device of claim 21 wherein the classifier is configured to determine the first context class by selecting the first context class from a plurality of predetermined available context classes.

30. The mobile device of claim 21 wherein the classifier is configured to create the fusion class by selecting the fusion class from a plurality of predetermined available fusion classes.

31. A non-transitory processor-readable storage medium comprising processor-readable instructions configured to cause a processor to:
  receive, using a classifier implemented in one or more integrated circuits of a mobile device, sensor data from at least one data source associated with a mobile device, the at least one data source comprising one or more sensors of the mobile device;
  determine, using the classifier implemented in the one or more integrated circuits, a first context class for the received sensor data, the first context class corresponding to a context state indicated by the received sensor data;
  determine, using the classifier implemented in the one or more integrated circuits, that a confidence value associated with the determination of the first context class is below a threshold value; and
  create, using the classifier implemented in the one or more integrated circuits, a fusion class for the received sensor data at least in part by fusing the first context class for the received sensor data and at least a second context class for the received sensor data, the at least the second context class being different from the first context class, wherein the fusion class semantically encompasses the first context class and the at least the second context class and further wherein the fusion class is broader than each of the first context class and the at least the second context class;
  substitute, using the classifier implemented in the one or more integrated circuits, the fusion class for the first context class; and
  output, using the classifier implemented in the one or more integrated circuits, the fusion class as an inferred context for the mobile device.

32. The storage medium of claim 31 wherein the at least one data source comprises one or more of an audio sensor, a transceiver, a motion sensor, a clock, a device usage sensor, a light sensor, a camera, or a calendar.

33. The storage medium of claim 31 further comprising instructions configured to cause the processor to determine the confidence value associated with the determination of the first context class.

34. The storage medium of claim 31 wherein the determination of the first context class is an initial classification of the received sensor data.

35. The storage medium of claim 31 wherein the instructions configured to cause the processor to substitute the fusion class are configured to cause the processor to substitute the fusion class in response to the confidence value associated with the determination of the first context class being below the threshold value.

36. The storage medium of claim 34 further comprising instructions configured to cause the processor to identify an operational property of the initial classification, the operational property including at least one of a motion, a location, an event, or an environment associated with the initial classification.

37. The storage medium of claim 36 wherein instructions configured to cause the processor to create the fusion class are configured to cause the processor to create the fusion class based on the operational property of the initial classification.

38. The storage medium of claim 31 further comprising instructions configured to cause the processor to:
  receive the sensor data over consecutive time periods;
  determine the first context class for the received sensor data associated with a first time period; and
  determine the at least the second context class for the received sensor data associated with at least a second time period that is after the first time period.

39. The storage medium of claim 31 wherein the instructions configured to cause the processor to determine the first context class are configured to cause the processor to select the first context class from a plurality of predetermined available context classes.

40. The storage medium of claim 31 wherein the instructions configured to cause the processor to create the fusion class are configured to cause the processor to select the fusion class from a plurality of predetermined available fusion classes.

41. The method of claim 1 wherein the creating the fusion class comprises selecting the fusion class from a plurality of predetermined available fusion classes corresponding to a particular application program.

42. The method of claim 8 comprising:
  determining, by the classifier implemented in the one or more integrated circuits of the mobile device, a temporal sequence of context classes determined for the consecutive time periods, the temporal sequence of context classes including the first context class and the at least the second context class; and
  creating, by the classifier implemented in the one or more integrated circuits of the mobile device, the fusion class for the received sensor data based on the temporal sequence of context classes.

* * * * *